US009575975B2

(12) United States Patent
Clark et al.

(10) Patent No.: US 9,575,975 B2
(45) Date of Patent: Feb. 21, 2017

(54) CLUSTER-WIDE UNIQUE ID FOR OBJECT ACCESS CONTROL LISTS

(75) Inventors: Nathan W. Clark, Millbury, MA (US); Trek Palmer, Cambridge, MA (US); Alan G. Bryant, East Walpole, MA (US)

(73) Assignee: Hitachi Data Systems Corporation, Santa Clara, CA (US)

( * ) Notice: Subject to any disclaimer, the term of this patent is extended or adjusted under 35 U.S.C. 154(b) by 227 days.

(21) Appl. No.: 14/364,210

(22) PCT Filed: Mar. 29, 2012

(86) PCT No.: PCT/US2012/031100
§ 371 (c)(1),
(2), (4) Date: Jun. 10, 2014

(87) PCT Pub. No.: WO2013/147782
PCT Pub. Date: Oct. 3, 2013

(65) Prior Publication Data
US 2015/0012497 A1 Jan. 8, 2015

(51) Int. Cl.
*G06F 17/30* (2006.01)
*G06F 11/14* (2006.01)

(52) U.S. Cl.
CPC ..... *G06F 17/30082* (2013.01); *G06F 11/1453* (2013.01); *G06F 17/30073* (2013.01); *G06F 17/30584* (2013.01)

(58) Field of Classification Search
None
See application file for complete search history.

(56) References Cited

U.S. PATENT DOCUMENTS

| 5,893,086 A * | 4/1999 | Schmuck ............ G06F 11/1435 |
| 6,324,581 B1 * | 11/2001 | Xu ..................... G06F 17/30171 707/999.01 |
| 7,155,466 B2 | 12/2006 | Rodriguez et al. |
| 7,657,581 B2 | 2/2010 | Orenstein et al. |
| 8,914,632 B1 * | 12/2014 | Shankar ............... H04L 63/101 713/167 |
| 2007/0189153 A1 | 8/2007 | Mason |
| 2008/0016240 A1 | 1/2008 | Balandin |
| 2008/0140947 A1 | 6/2008 | Slik et al. |

(Continued)

*Primary Examiner* — Aleksandr Kerzhner
*Assistant Examiner* — Eddy Cheung
(74) *Attorney, Agent, or Firm* — Mattingly & Malur, PC

(57) ABSTRACT

A redundant array of independent nodes are networked together. Each node executes an instance of an application that provides object-based storage. The nodes are grouped into systems each having multiple nodes. Objects in the systems have access control lists (ACLs) associated therewith. A method of providing a search key to each ACL in any one system comprises: selecting a region for each metadata object pertaining to the objects in the system; and generating, for each ACL associated with an object in the system, an ACL ID (identifier) as a search key which includes the region number of the region selected for the metadata object pertaining to the object, a region map level corresponding to the region selected, and a monotonically increasing counter value that is automatically incremented each time an ACL ID is generated. The ACL ID remains unique during reconfiguration via splitting/merging existing distributed portions of the database.

12 Claims, 11 Drawing Sheets

(56) References Cited

U.S. PATENT DOCUMENTS

| | | | |
|---|---|---|---|
| 2009/0049047 A1* | 2/2009 | Battepati | G06F 21/6218 |
| 2011/0010161 A1 | 1/2011 | Das et al. | |
| 2011/0191300 A1* | 8/2011 | Orenstein | G06F 17/30 707/646 |
| 2012/0054252 A1* | 3/2012 | Olderdissen | G06F 17/30182 707/823 |
| 2012/0185555 A1* | 7/2012 | Regni | G06F 9/465 709/214 |

* cited by examiner

CLUSTER-WIDE UNIQUE ID FOR OBJECT ACCESS CONTROL LISTS

BACKGROUND OF THE INVENTION

The present invention relates generally to storage systems and, more particularly, to system and method for providing a cluster-wide unique identifier (ID) for any given object access control list (ACL) so as to provide a search key to the ACL in the cluster-wide distributed database in a replicated object storage system.

Objects can have Access Control Lists (ACLs) associated with them. For any given ACL, there is a high likelihood that many objects will share the same ACL. To save on storage needed to record ACLs for individual objects, each unique ACL will be stored in a separate cluster-wide distributed database table and each object will need to have an ID for the assigned ACL. This is typical many-to-one database association.

U.S. Pat. No. 7,657,581, the entire content of which is incorporated herein by reference, describes a highly available metadata system in a clustered environment that has a feature of distributing database content into regions (several small databases) to achieve both data distribution and protection. Each region database comprises a self-reliant subset of content metadata with simplistic one-to-one associations between database records, and all related metadata will reside in one region database for a given collection of fixed content. With this organization, it is possible to perform expansion or shrinking of the number of database regions to allow for greater variants in scale of the overall cluster database by performing simple bulk record movement between region databases without having to update internal associations between database records.

BRIEF SUMMARY OF THE INVENTION

Exemplary embodiments of the invention provide a solution to create and manage database record IDs used in many-to-one database record associations that still allows for highly efficient record movement between regions without having to regenerate all the record IDs and associations. With the support of many-to-one associations, this will allow for more efficient database schema design that avoids repetitive records for the same metadata information; thus avoiding database bloat.

The problem is to generate a cluster-wide unique ID for the ACL to provide a search key to the ACL in the cluster-wide distributed database that can be used to associate the object(s) for which it is applicable. The ACL unique ID must be capable of being able to remain valid when the cluster-wide database is undergoing reconfiguration via splitting or merging existing distributed portions of the database.

The cluster-wide distributed database has smaller databases owned by a storage region in the replicated object storage system. These regions are distributed evenly throughout the system and manage a subset of the overall content in the system. A region is selected for an item (e.g., an ACL and object) at creation time. A region database is responsible for managing objects and their ACL throughout its life-cycle. The solution is to generate an ACL unique ID via the method of combining database region information (number and level) for which the ACL is initially created along with additional monotonically increasing counter value for the region/level. The combination of these values will be used as the primary key within the region database for the ACL. This primary key (i.e., ACL ID) will be used to associate ACLs with objects managed by a region. When regions are either split or merged, the object metadata and the associated ACL records can be moved to a new region without requiring an update to all object/ACL associations since the ACL unique ID is cluster-wide unique. Any collisions of ACL IDs during a merge are handled by dropping ACL records from the source and writing the object metadata records as they exist, thus linking the objects to the existing ACL records.

A redundant array of independent nodes are grouped into a plurality of systems each having multiple nodes, objects in the plurality of systems having access control lists (ACLs) associated with the objects. Object metadata of the objects are stored in a form of metadata objects in a set of regions distributed across the array. An aspect of the present invention is directed to a method of providing a search key to each ACL in any one system of the plurality of systems, the method comprising, for the one system: selecting a region for each metadata object pertaining to the objects in the system, each region having a region number, wherein the region number of the region to select for a metadata object is identified by hashing a metadata object attribute of the metadata object and extracting a number of bits of a resulting hash value, wherein a region map for each region identifies a node that stores an authoritative region copy of the region and further identifies zero or more nodes that each store a backup copy of the region, wherein a region map level dictates the number of bits to use of the resulting hash value to identify the region for the metadata object, wherein there are 2N regions and N is the region map level; and generating, for each ACL associated with an object in the system, an ACL ID (identifier) as a search key which includes the region number of the region selected for the metadata object pertaining to the object, the region map level corresponding to the region selected, and a monotonically increasing counter value that is automatically incremented each time an ACL ID is generated.

In some embodiments, each region is uniquely identified by a combination of the region map level and the region number, each ACL ID is uniquely identified by a combination of the region map level and the region number and the counter value, and each region has a corresponding region database that shows, via the ACL IDs, relationships between the objects and the ACLs associated with the objects in the system. The method further comprises, in response to increasing the region map level from a current region map level of N to a next region map level of N+1: increasing the number of regions and the number of corresponding region databases from 2N current level regions and current level region databases to 2N+1 next level regions and next level region databases; redistributing the metadata objects in the current level regions and any new metadata objects pertaining to new objects to the next level regions, wherein the region number of the region of the next level regions to select for a metadata object is identified by hashing a metadata object attribute of the metadata object and extracting a number of bits of a resulting hash value, and wherein the next region map level dictates the number of bits to use of the resulting hash value to identify the region for the metadata object; and if there are one or more new objects in the system, then generating, for each ACL associated with a new object in the system, a new ACL ID which includes the region number of the region selected for the new metadata object pertaining to the new object, the region map level corresponding to the region selected, and the monotonically increasing counter value that is automatically incremented each time an ACL ID is generated. The redistributing comprises: for each next level region database, performing a query on the current level region databases to identify all metadata objects to be redistributed to said each next level region database; and copying the identified metadata objects to said each next level region database.

In specific embodiments, the method further comprises, in response to decreasing the region map level from a current region map level of N to a next region map level of N−1: decreasing the number of regions and the number of corresponding region databases from 2N current level regions and current level region databases to 2N−1 next level regions and next level region databases; and redistributing the metadata objects in the current level regions to the next level regions, wherein the region number of the region of the next level regions to select for a metadata object is identified by hashing a metadata object attribute of the metadata object, and wherein the next region map level dictates the number of bits to use of the resulting hash value to identify the region for the metadata object. The redistributing comprises: for each next level region database, performing a query on the current level region databases to identify all metadata objects to be redistributed to said each next level region database; and copying the identified metadata objects to said each next level region database. The method further comprises, if there are multiple ACL IDs for a same ACL after the redistributing: selecting one ACL ID which has the highest counter value from the multiple ACL IDs; removing each remaining ACL ID not selected from the multiple ACL IDs; and updating the relationships between the objects and the ACLs associated with the objects in the system as a result of the selecting one ACL ID and the removing.

Another aspect of the invention is directed to an apparatus for providing a search key to each ACL in any one system of the plurality of systems. The apparatus comprises a processor, a memory, and a search key module. The search key module is configured to: select a region for each metadata object pertaining to the objects in the system, each region having a region number, wherein the region number of the region to select for a metadata object is identified by hashing a metadata object attribute of the metadata object and extracting a number of bits of a resulting hash value, wherein a region map for each region identifies a node that stores an authoritative region copy of the region and further identifies zero or more nodes that each store a backup copy of the region, wherein a region map level dictates the number of bits to use of the resulting hash value to identify the region for the metadata object, wherein there are 2N regions and N is the region map level; and generate, for each ACL associated with an object in the system, an ACL ID as a search key which includes the region number of the region selected for the metadata object pertaining to the object, the region map level corresponding to the region selected, and a monotonically increasing counter value that is automatically incremented each time an ACL ID is generated.

Another aspect of this invention is directed to a computer-readable storage medium storing a plurality of instructions for controlling a data processor to provide a search key to each ACL in any one system of the plurality of systems, the plurality of instructions comprising: instructions that cause the data processor to select a region for each metadata object pertaining to the objects in the system, each region having a region number, wherein the region number of the region to select for a metadata object is identified by hashing a metadata object attribute of the metadata object and extracting a number of bits of a resulting hash value, wherein a region map for each region identifies a node that stores an authoritative region copy of the region and further identifies zero or more nodes that each store a backup copy of the region, wherein a region map level dictates the number of bits to use of the resulting hash value to identify the region for the metadata object, wherein there are 2N regions and N is the region map level; and instructions that cause the data processor to generate, for each ACL associated with an object in the system, an ACL ID as a search key which includes the region number of the region selected for the metadata object pertaining to the object, the region map level corresponding to the region selected, and a monotonically increasing counter value that is automatically incremented each time an ACL ID is generated.

These and other features and advantages of the present invention will become apparent to those of ordinary skill in the art in view of the following detailed description of the specific embodiments.

DETAILED DESCRIPTION OF THE INVENTION

Figure 1:
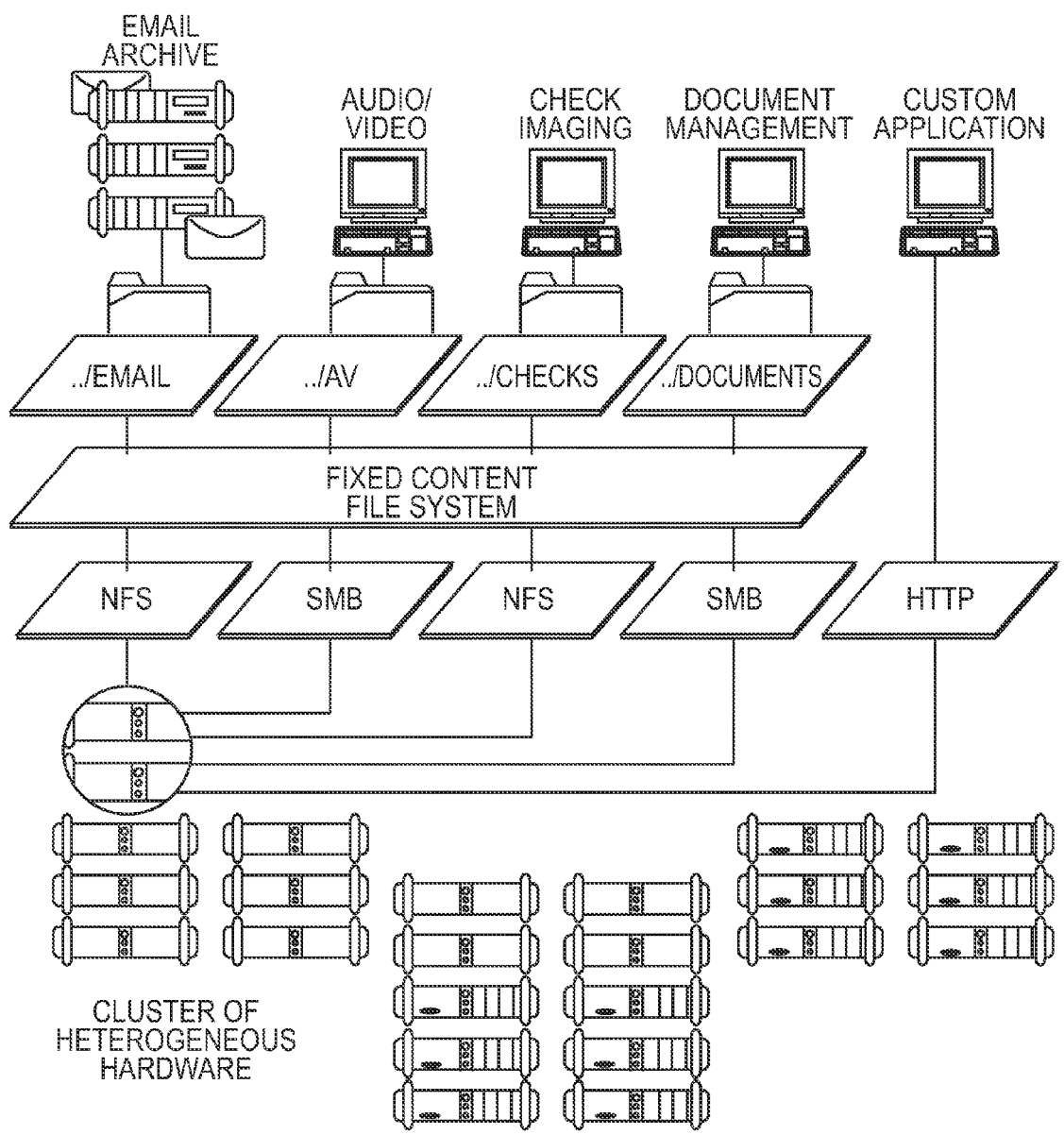
FIG. 1 is a simplified block diagram of a fixed content storage archive in which the method and apparatus of the invention may be applied.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for providing a cluster-wide unique identifier for any given object ACL so as to provide a search key to the ACL in the cluster-wide distributed database in a replicated object storage system.

I. Fixed Content Distributed Data Storage

A need has developed for the archival storage of "fixed content" in a highly available, reliable and persistent manner that replaces or supplements traditional tape and optical storage solutions. The term "fixed content" typically refers to any type of digital information that is expected to be retained without change for reference or other purposes. Examples of such fixed content include, among many others, e-mail, documents, diagnostic images, check images, voice recordings, film and video, and the like. The traditional Redundant Array of Independent Nodes (RAIN) storage approach has emerged as the architecture of choice for creating large online archives for the storage of such fixed content information assets. By allowing nodes to join and exit from a cluster as needed, RAIN architectures insulate a storage cluster from the failure of one or more nodes. By replicating data on multiple nodes, RAIN-type archives can automatically compensate for node failure or removal. Typically, RAIN systems are largely delivered as hardware appliances designed from identical components within a closed system.

FIG. 1 illustrates one such scalable disk-based archival storage management system. The nodes may comprise different hardware and thus may be considered "heterogeneous." A node typically has access to one or more storage disks, which may be actual physical storage disks, or virtual storage disks, as in a storage area network (SAN). The archive cluster application (and, optionally, the underlying operating system on which that application executes) that is supported on each node may be the same or substantially the same. The software stack (which may include the operating system) on each node is symmetric, whereas the hardware may be heterogeneous. Using the system, as illustrated in FIG. 1, enterprises can create permanent storage for many different types of fixed content information such as documents, e-mail, satellite images, diagnostic images, check images, voice recordings, video, and the like, among others. These types are merely illustrative, of course. High levels of reliability are achieved by replicating data on independent servers, or so-called storage nodes. Preferably, each node is symmetric with its peers. Thus, because preferably any given node can perform all functions, the failure of any one node has little impact on the archive's availability.

Figure 2:
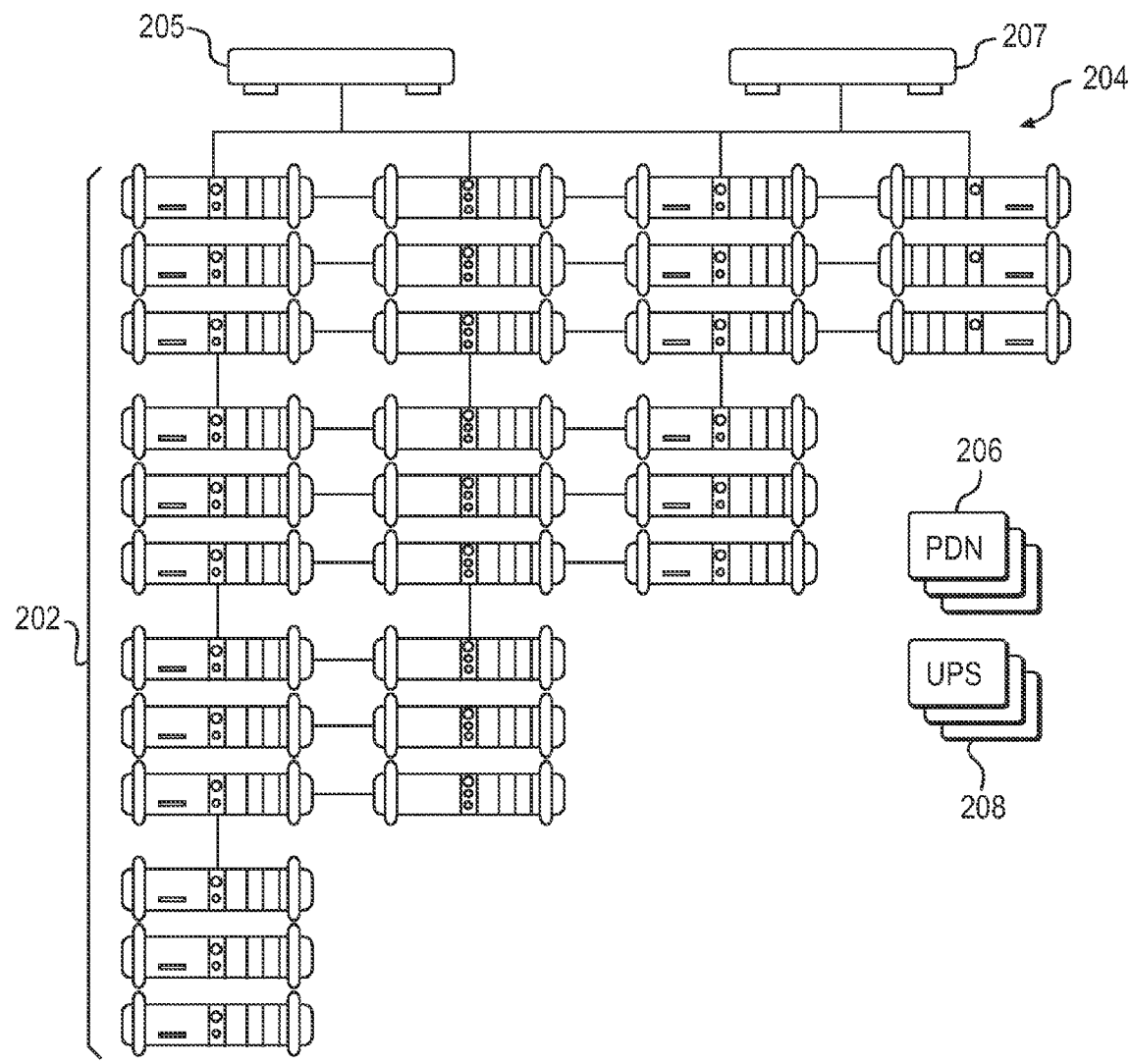
FIG. 2 is a simplified representation of a redundant array of independent nodes each of which is symmetric and supports an archive cluster application.

As described in commonly owned U.S. Pat. No. 7,155,466, it is known in a RAIN-based archival system to incorporate a distributed software application executed on each node that captures, preserves, manages, and retrieves digital assets. FIG. 2 illustrates one such system. A physical boundary of an individual archive is referred to as a cluster (or a system). Typically, a cluster is not a single device, but rather a collection of devices. Devices may be homogeneous or heterogeneous. A typical device is a computer or machine running an operating system such as Linux. Clusters of Linux-based systems hosted on commodity hardware provide an archive that can be scaled from a few storage node servers to many nodes that store thousands of terabytes of data. This architecture ensures that storage capacity can always keep pace with an organization's increasing archive requirements.

In storage systems such as described above, data typically is distributed across the cluster randomly so that the archive is always protected from device failure. If a disk or node fails, the cluster automatically fails over to other nodes in the cluster that maintain replicas of the same data. While this approach works well from a data protection standpoint, a calculated mean time to data loss (MTDL) for the cluster may not be as high as desired. In particular, MTDL typically represents a calculated amount of time before the archive will lose data. In a digital archive, any data loss is undesirable, but due to the nature of hardware and software components, there is always a possibility (however remote) of such an occurrence. Because of the random distribution of objects and their copies within an archive cluster, MTDL may end up being lower than required since, for example, a needed copy of an object may be unavailable if a given disk (on which a mirror copy is stored) within a given node fails unexpectedly.

As shown in FIG. 2, an illustrative cluster in which the present invention is implemented preferably comprises the following general categories of components: nodes 202, a pair of network switches 204, power distribution units (PDUs) 206, and uninterruptible power supplies (UPSs) 208. A node 202 typically comprises one or more commodity servers and contains a CPU (e.g., Intel x86, suitable random access memory (RAM), one or more hard drives (e.g., standard IDE/SATA, SCSI, or the like), and two or more network interface (NIC) cards. A typical node is a 2U rack mounted unit with a 2.4 GHz chip, 512 MB RAM, and six (6) 200 GB hard drives. This is not a limitation, however. The network switches 204 typically comprise an internal switch 205 that enables peer-to-peer communication between nodes, and an external switch 207 that allows extra-cluster access to each node. Each switch requires enough ports to handle all potential nodes in a cluster. Ethernet or Gig E switches may be used for this purpose. PDUs 206 are used to power all nodes and switches, and the UPSs 208 are used that protect all nodes and switches. Although not meant to be limiting, typically a cluster is connectable to a network, such as the public Internet, an enterprise intranet, or other wide area or local area network. In an illustrative embodiment, the cluster is implemented within an enterprise environment. It may be reached, for example, by navigating through a site's corporate domain name system (DNS) name server. Thus, for example, the cluster's domain may be a new sub-domain of an existing domain. In a representative implementation, the sub-domain is delegated in the corporate DNS server to the name servers in the cluster itself. End users access the cluster using any conventional interface or access tool. Thus, for example, access to the cluster may be carried out over any IP-based protocol (HTTP, FTP, NFS, AFS, SMB, a Web service, or the like), via an API, or through any other known or later-developed access method, service, program, or tool.

Client applications access the cluster through one or more types of external gateways such as standard UNIX file protocols, or HTTP APIs. The archive preferably is exposed through a virtual file system that can optionally sit under any standard UNIX file protocol-oriented facility. These include NFS, FTP, SMB/CIFS, or the like.

In one embodiment, the archive cluster application runs on a redundant array of independent nodes (H-RAIN) that are networked together (e.g., via Ethernet) as a cluster. The hardware of given nodes may be heterogeneous. For maximum reliability, however, preferably each node runs an instance 300 of the distributed application (which may be the same instance, or substantially the same instance), which comprises several runtime components as now illustrated in FIG. 3. Thus, while hardware may be heterogeneous, the software stack on the nodes (at least as it relates to the present invention) is the same. These software components comprise a gateway protocol layer 302, an access layer 304, a file transaction and administration layer 306, and a core components layer 308. The "layer" designation is provided for explanatory purposes, as one of ordinary skill will appreciate that the functions may be characterized in other meaningful ways. One or more of the layers (or the components therein) may be integrated or otherwise. Some components may be shared across layers.

The gateway protocols in the gateway protocol layer 302 provide transparency to existing applications. In particular, the gateways provide native file services such as NFS 310 and SMB/CIFS 312, as well as a Web services API to build custom applications. HTTP support 314 is also provided. The access layer 304 provides access to the archive. In particular, according to the invention, a Fixed Content File System (FCFS) 316 emulates a native file system to provide full access to archive objects. FCFS gives applications direct access to the archive contents as if they were ordinary files. Preferably, archived content is rendered in its original format, while metadata is exposed as files. FCFS 316 provides conventional views of directories and permissions and routine file-level calls, so that administrators can provision fixed-content data in a way that is familiar to them. File access calls preferably are intercepted by a user-space daemon and routed to the appropriate core component (in layer 308), which dynamically creates the appropriate view to the calling application. FCFS calls preferably are constrained by archive policies to facilitate autonomous archive management. Thus, in one example, an administrator or application cannot delete an archive object whose retention period (a given policy) is still in force.

The access layer 304 preferably also includes a Web user interface (UI) 318 and an SNMP gateway 320. The Web user interface 318 preferably is implemented as an administrator console that provides interactive access to an administration engine 322 in the file transaction and administration layer 306. The administrative console 318 preferably is a password-protected, Web-based GUI that provides a dynamic view of the archive, including archive objects and individual nodes. The SNMP gateway 320 offers storage management applications easy access to the administration engine 322, enabling them to securely monitor and control cluster activity. The administration engine monitors cluster activity, including system and policy events. The file transaction and administration layer 306 also includes a request manager process 324. The request manager 324 orchestrates all requests from the external world (through the access layer 304), as well as internal requests from a policy manager 326 in the core components layer 308.

In addition to the policy manager 326, the core components also include a metadata manager 328, and one or more instances of a storage manager 330. A metadata manager 328 preferably is installed on each node. Collectively, the metadata managers in a cluster act as a distributed database, managing all archive objects. On a given node, the metadata manager 328 manages a subset of archive objects, where preferably each object maps between an external file ("EF," the data that entered the archive for storage) and a set of internal files (each an "IF") where the archive data is physically located. The same metadata manager 328 also manages a set of archive objects replicated from other nodes. Thus, the current state of every external file is always available to multiple metadata managers on several nodes. In the event of node failure, the metadata managers on other nodes continue to provide access to the data previously managed by the failed node. The storage manager 330 provides a file system layer available to all other components in the distributed application. Preferably, it stores the data objects in a node's local file system. Each drive in a given node preferably has its own storage manager. This allows the node to remove individual drives and to optimize throughput. The storage manager 330 also provides system information, integrity checks on the data, and the ability to traverse directly local structures.

Figure 3:
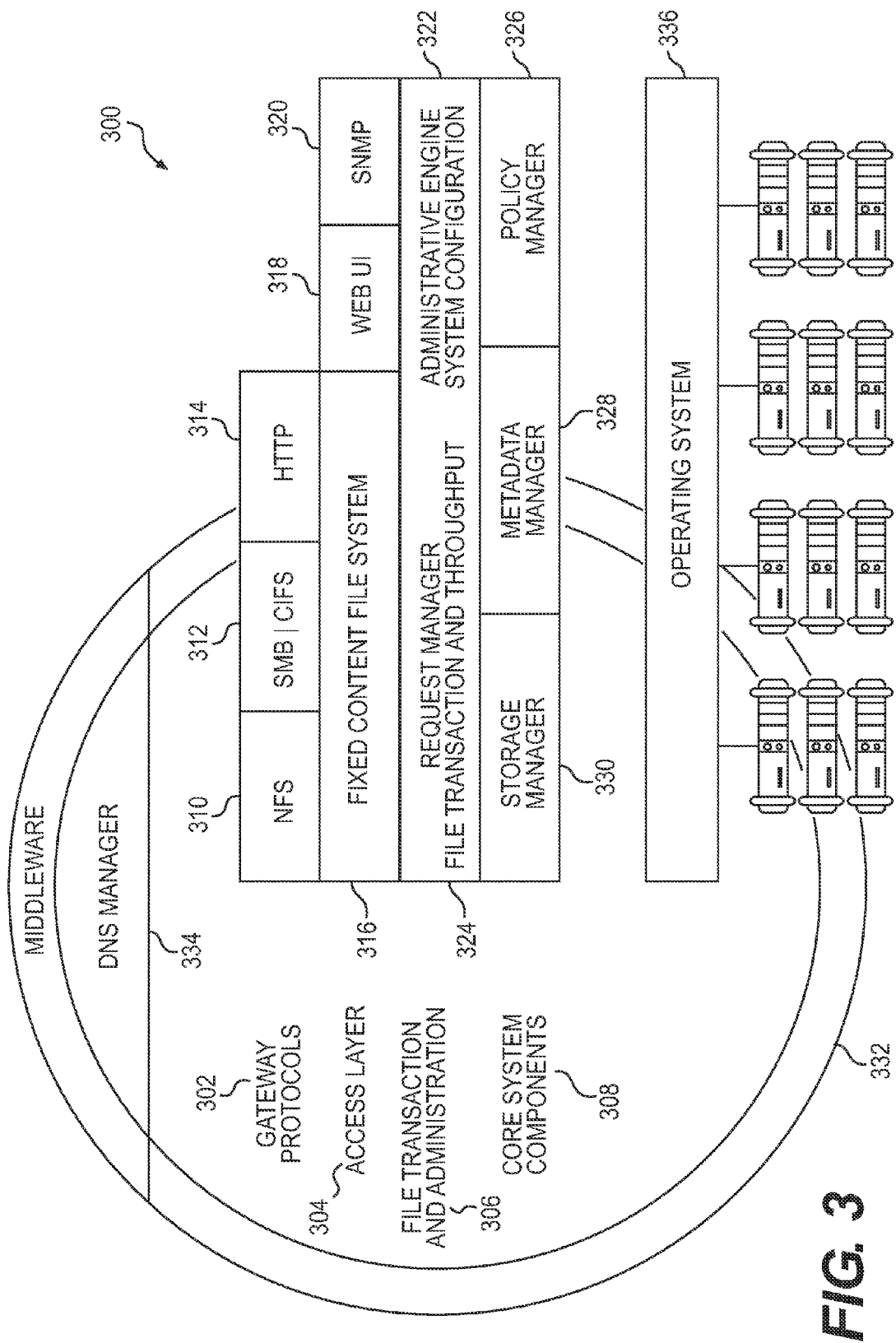
FIG. 3 is a high level representation of the various components of the archive cluster application executing on a given node.

As also illustrated in FIG. 3, the cluster manages internal and external communication through a communications middleware layer 332 and a DNS manager 334. The infrastructure 332 is an efficient and reliable message-based middleware layer that enables communication among archive components. In an illustrated embodiment, the layer supports multicast and point-to-point communications. The DNS manager 334 runs distributed name services that connect all nodes to the enterprise server. Preferably, the DNS manager (either alone or in conjunction with a DNS service) load balances requests across all nodes to ensure maximum cluster throughput and availability.

In an illustrated embodiment, an application such as the HCP (Hitachi Content Platform) application instance executes on a base operating system 336, such as Red Hat Linux 9.0, Fedora Core 6, or the like. The communications middleware is any convenient distributed communication mechanism. Other components may include FUSE (Filesystem in USErspace), which may be used for the Fixed Content File System (FCFS) 316. The NFS gateway 310 may be implemented by a standard nfsd Linux Kernel NFS driver. The database in each node may be implemented, for example, PostgreSQL (also referred to herein as Postgres), which is an object-relational database management system (ORDBMS). The node may include a Web server, such as Jetty, which is a Java HTTP server and servlet container. Of course, the above mechanisms are merely illustrative.

The storage manager 330 on a given node is responsible for managing the physical storage devices. Preferably, each storage manager instance is responsible for a single root directory into which all files are placed according to its placement algorithm. Multiple storage manager instances can be running on a node at the same time, and each usually represents a different physical disk in the system. The storage manager abstracts the drive and interface technology being used from the rest of the system. When the storage manager instance is asked to write a file, it generates a full path and file name for the representation for which it will be responsible. In a representative embodiment, each object to be stored on a storage manager is received as raw data to be stored, with the storage manager then adding its own metadata to the file as it stores the data to keep track of different types of information. By way of example, this metadata includes: EF length (length of external file in bytes), IF Segment size (size of this piece of the Internal File), EF Protection representation (EF protection mode), IF protection role (representation of this internal file), EF Creation timestamp (external file timestamp), Signature (signature of the internal file at the time of the write (PUT), including a signature type), and EF Filename (external file filename). Storing this additional metadata with the internal file data provides for additional levels of protection. In particular, scavenging can create external file records in the database from the metadata stored in the internal files. Other policies can validate internal file hash against the internal file to validate that the internal file remains intact.

Internal files may be "chunks" of data representing a portion of the original "file" in the archive object, and they may be placed on different nodes to achieve striping and protection blocks. This breaking apart of an external file into smaller chunked units is not a requirement, however; in the alternative, internal files may be complete copies of the external file. Typically, one external file entry is present in a metadata manager for each archive object, while there may be many internal file entries for each external file entry. Typically, internal file layout depends on the system. In a given implementation, the actual physical format of this data on disk is stored in a series of variable length records.

The request manager 324 is responsible for executing the set of operations needed to perform archive actions by interacting with other components within the system. The request manager supports many simultaneous actions of different types, is able to roll-back any failed transactions, and supports transactions that can take a long time to execute. The request manager further ensures that read/write operations in the archive are handled properly and guarantees all requests are in a known state at all times. It also provides transaction control for coordinating multiple read/write operations across nodes to satisfy a given client request. In addition, the request manager caches metadata manager entries for recently used files and provides buffering for sessions as well as data blocks.

A cluster's primary responsibility is to store an unlimited number of files on disk reliably. A given node may be thought of as being "unreliable," in the sense that it may be unreachable or otherwise unavailable for any reason. A collection of such potentially unreliable nodes collaborate to create reliable and highly available storage. Generally, there are two types of information that need to be stored: the files themselves and the metadata about the files. Additional details of the fixed content distributed data storage can be found in U.S. Patent Publication No. 2007/0189153 and U.S. Pat. No. 7,657,581, which are incorporated herein by reference.

II. Metadata Management

A metadata management system is responsible for organizing and providing access to given metadata, such as system metadata. This system metadata includes information on files placed in the archive, as well as configuration information, information displayed on the administrative UI, metrics, information on irreparable policy violations, and the like. Although not illustrated in detail, other types of metadata (e.g., user metadata associated with archived files) may also be managed using the metadata management system that is now described.

In a representative embodiment of the cluster, the metadata management system provides persistence for a set of metadata objects, which may include one or more of the following object types (which are merely illustrative):

External File: a file as perceived by a user of the archive;

Internal File: a file stored by the Storage Manager; typically, there may be a one-to-many relationship between External Files and Internal Files.

ConfigObject: a name/value pair used to configure the cluster;

AdminLogEntry: a message to be displayed on the administrator UI;

MetricsObject: a timestamped key/value pair, representing some measurement of the archive (e.g., number of files) at a point in time; and PolicyState: a violation of some policy.

Each metadata object may have a unique name that preferably never changes. Metadata objects are organized into regions. A region comprises an authoritative region copy and a "tolerable points of failure" (TPOF) number (a set of zero or more) backup region copies. With zero copies, the metadata management system is scalable but may not be highly available. A region is selected by hashing one or more object attributes (e.g., the object's name, such as a fully qualified pathname, or portion thereof) and extracting a given number of bits of the hash value. These bits comprise a region number. The bits selected may be low order bits, high order bits, middle order bits, or any combination of individual bits. In a representative embodiment, the given bits are the low order bits of the hash value. The object's attribute or attributes may be hashed using any convenient hash function. These include, without limitation, a Java-based hash function such as java.lang.string.hashCode, and the like. Preferably, the number of bits comprising the region number is controlled by a configuration parameter, referred to herein as regionMapLevel. If this configuration parameter is set to 6, for example, this results in $2^6=64$ regions. Of course, a larger number of regions are permitted, and the number of regions may be adjusted automatically using a namespace partitioning scheme.

Each region may be stored redundantly. As noted above, there is one authoritative copy of the region, and zero or more backup copies. The number of backup copies is controlled by the metadata TPOF configuration parameter, as has been described. Preferably, region copies are distributed across all the nodes of the cluster so as to balance the number of authoritative region copies per node, and to balance the number of total region copies per node.

The metadata management system stores metadata objects in a database running on each node. This database is used to support the region map. An exemplary database is implemented using PostgreSQL, which is available as open source. Preferably, there is a schema for each region copy, and in each schema there is a table for each type of metadata object. A schema is simply a namespace that can own tables, indexes, procedures, and other database objects. Each region preferably has its own schema. Each schema has a complete set of tables, one for each metadata object. A row in one of these tables corresponds to a single metadata object. While Postgres is a preferred database, any convenient relational database (e.g., Oracle, IBM DB/2, or the like) may be used.

As used herein, a namespace is a logical partition of the cluster, and essentially serves as a collection of objects particular to at least one defined application. Each namespace has a private filesystem with respect to other namespaces. Moreover, access to one namespace does not grant a user access to another namespace. A cluster/system of nodes is a physical archive instance.

Figure 4:
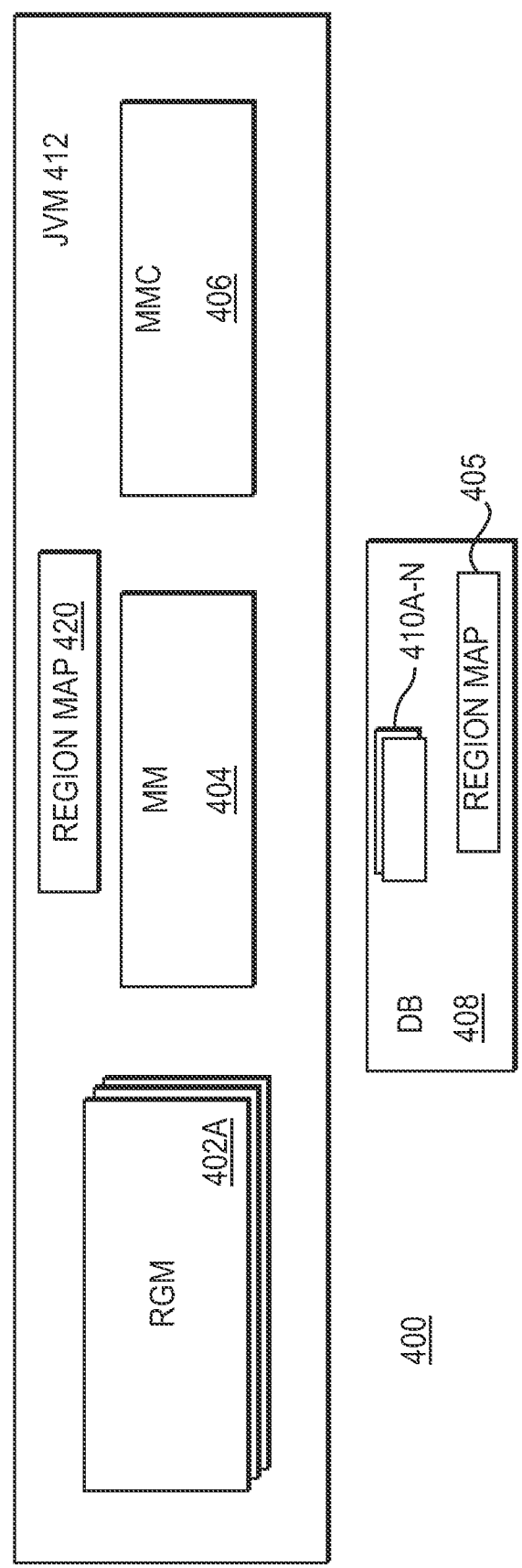
FIG. 4 illustrates an example of the components of the metadata management system on a given node of the cluster.

As illustrated in FIG. 4, each node 400 has a set of processes or components: one or more region managers (RGM) 402a-n, a metadata manager (MM) 404, at least one metadata manager client (MMC) 406, and a database 408 having one or more schemas 410a-n. The RGM(s), MM and MMC components execute with a virtual machine 412, such as a Java virtual machine. There is one RGM for each region copy. Thus, there is an RGM for the authoritative region copy, an RGM for each backup region copy, and an RGM for each incomplete region copy. There is also a database schema 410 for each RGM 402, which manages that schema. The database also stores the region map 405. Each node preferably has the same global view of the region map, with requirement being enforced by a synchronization scheme. A region manager RGM 402 is responsible for operating on a region copy (be it authoritative, backup or incomplete, as the case may be), and for executing requests submitted by the metadata manager clients 406 and by other region managers 402. Requests are provided to a given RGM through any convenient means, such as the communications middleware or other messaging layer illustrated in FIG. 3. The region manager provides an execution environment in which these requests execute, e.g., by providing a connection to the database, configured to operate on the schema that is being managed by that RGM. Each region manager stores its data in the database 408. The metadata manager 404 is a top-level component responsible for metadata management on the node. It is responsible for creating and destroying region managers (RGMs) and organizing resources needed by the RGMs, e.g., cluster configuration information and a pool of database connections. Preferably, a given metadata manager (in a given node) acts as a leader and is responsible for determining which metadata managers (across a set or subset of nodes) are responsible for which region copies. A leader election algorithm, such as the bully algorithm, or a variant thereof, may be used to select the metadata manager leader. Preferably, each node has a single metadata manager, although it is possible to run multiple MMs per node. Once region ownership has been established by the namespace partitioning scheme (as will be described below), each metadata manager is responsible for adjusting its set of one or more region managers accordingly. System components (e.g., the administrative engine, the policy manager, and the like) interact with the metadata manager MM through the metadata manager client. The MMC is responsible (using the region map) for locating the RGM to carry out a given request, for issuing the request to the selected RGM, and for retrying the request if the selected RGM is unavailable (because, for example, the node has failed). In the latter case, a retry request will succeed when a new region map is received at the node.

As mentioned above, a region map identifies the node responsible for each copy of each region. The virtual machine 412 (and each RGM, MM and MMC component therein) has access to the region map 405; a copy 420 of the region map, after it has been copied into the JVM, is also shown in FIG. 4. The region map thus is available to both the JVM and the database in a given node. In this illustrative embodiment, each metadata object has an attribute (e.g., a name), which is hashed to yield an integer between 0x0 and 0x3fffffff inclusive, i.e., 30-bit values. These values can be represented comfortably in a signed 32-bit integer without running into overflow issues (e.g., when adding 1 to the high end of the range). The 30 bits allow for up to approximately 1 billion regions, which is sufficient even for large clusters. A region represents a set of hash values, and the set of all regions covers all possible hash values. There is a different bit position for each region, and the different bit positions preferably are in a fixed order. Thus, each region is identified by a number, which preferably is derived by extracting the RegionLevelMap bits of the hash value. Where the configuration parameter is set to 6, allowing for 64 regions, the resulting hash values are the numbers 0x0 through 0x3f.

As previously noted, a region copy is in one of three (3) states: "authoritative," "backup" and "incomplete." If the region copy is authoritative, all requests to the region go to this copy, and there is one authoritative copy for each region. If the region copy is a backup, the copy receives backup requests (from an authoritative region manager process). A region copy is incomplete if metadata is being loaded but the copy is not yet synchronized (typically, with respect to other backup copies). An incomplete region copy is not eligible for promotion to another state until synchronization is complete, at which point the copy becomes a backup copy. Each region has one authoritative copy and a given number (as set by the metadataTPOF configuration parameter) backup or incomplete copies.

A backup region copy is kept synchronized with the authoritative region copy by enforcing a given protocol (or "contract") between an authoritative region copy and its TPOF backup copies. This protocol is now described.

By way of brief background, when an update request is received at an MMC, the MMC does a lookup on the local region map to find the location of the authoritative region copy. The MMC sends the update request to the RGM associated with the authoritative region copy, which then commits it. The update is also sent (by the RGM associated with the authoritative region copy) to the RGM of each of the TPOF backup copies. The authoritative RGM, however, in order to indicate success, need not wait for each RGM associated with a backup region copy to commit the update; rather, when an RGM associated with a backup region copy receives the update, it immediately returns or tries to return (to the authoritative RGM) an acknowledgement. This acknowledgement is issued when the backup request is received and before it is executed. In the case where no failures occur, once the authoritative RGM receives all of the acknowledgements, it notifies the MMC, which then returns a success to the caller. If, however, a given failure event occurs, the protocol ensures that the impacted RGM (whether backup or authoritative) removes itself (and potentially the affected node) from service, and a new region map is issued by the MM leader. Preferably, the RGM removes itself from service by bringing down the JVM although any convenient technique may be used. The new map specifies a replacement for the lost region copy. In this manner, each backup region copy is a "hot standby" for the authoritative region copy and is thus eligible for promotion to authoritative if and when needed (either because the authoritative RGM fails, for load balancing purposes, or the like).

There are several ways in which the update process can fail. Thus, for example, the authoritative region manager (while waiting for the acknowledgement) may encounter an exception indicating that the backup manager process has died or, the backup manager process may fail to process the update request locally even though it has issued the acknowledgement or, the backup region manager process while issuing the acknowledgement may encounter an exception indicating that the authoritative region manager process has died, and so on. As noted above, if a given backup RGM cannot process the update, it removes itself from service. Moreover, when either a backup RGM or the authoritative RGM dies, a new region map is issued.

The metadata management system keeps copies of a region synchronized. An update that is done to an object in the authoritative region copy is replicated on the backup region copies. Once an update is committed by the authoritative RGM, the same update is applied to all backup region copies. The metadata management system ensures that any such failure (whether at the node level, the region manager level or the like) causes reassignment of region copies on the failed node; thus, the integrity of the remaining region copies is guaranteed. If a node containing an authoritative RGM fails, then the backup RGMs are either in sync (with or without a currently executing update), or they are out of sync only by the update that was interrupted. In the latter case, re-synchronizing is easy. Because backup regions are kept synchronized with authoritative regions, a promotion (from backup to authoritative) is instantaneous.

A node failure is also likely to lose backup regions. A backup region is restored by creating, on some other node, a new, incomplete region. As soon as the incomplete region is created, it starts recording updates and starts copying data from the authoritative region. When the copying is complete, the accumulated updates are applied, resulting in an up-to-date backup. The new backup region then informs the MM leader that it is up to date, which will cause the MM leader to send out a map including the promotion of the region (from incomplete to backup).

It should be noted that there is no requirement that the number of regions correspond to the number of nodes. More generally, the number of regions is uncorrelated with the number of nodes in the array of independent nodes. Additional details of the metadata management can be found in U.S. Pat. No. 7,657,581.

III. ACL Unique ID Construction

Figure 5:
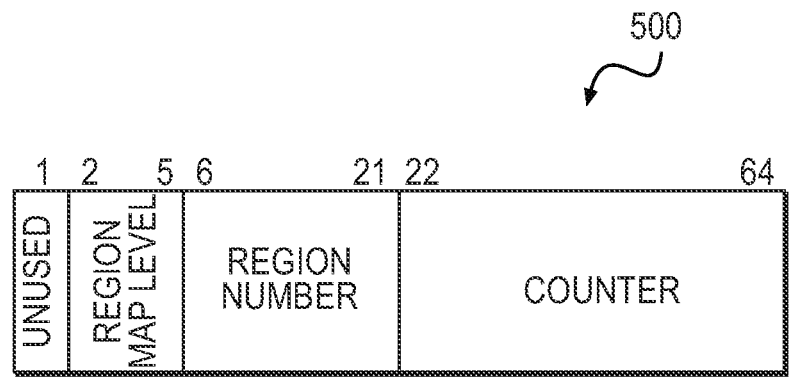
FIG. 5 shows an example of an ACL ID bit-wise construction.

The ACL unique ID is constructed from internal identifiers assigned as part of the metadata manager architecture along with a counter value. As described above, the cluster-wide database consists of regions. A region is comprised of a smaller database of object metadata for a subset of all objects (also referred to as content objects) existing in the replicated object storage system. To determine in which region the object metadata should reside, a portion of the hash value for the object path is used to derive a region number. The number of bits dictates the number of regions that can exist on the system. To allow for expansion of the number of regions, a region map level was introduced that dictates the number of bits to use of the hash to identify the region for the object metadata. The combination of region number and current region map level uniquely identifies a particular region. With this understanding, the ACL unique ID will be generated from the region identification along with a monotonically increasing counter (i.e., SQL SEQUENCE) for that region and map level combination. This unique ID 500 is constructed via 64-bit integer with the bit assignment illustrated in FIG. 5, which shows an example of an ACL ID bit-wise construction. The construction includes an unused bit, followed by the region map level, the region number, and the counter.

Figure 6:
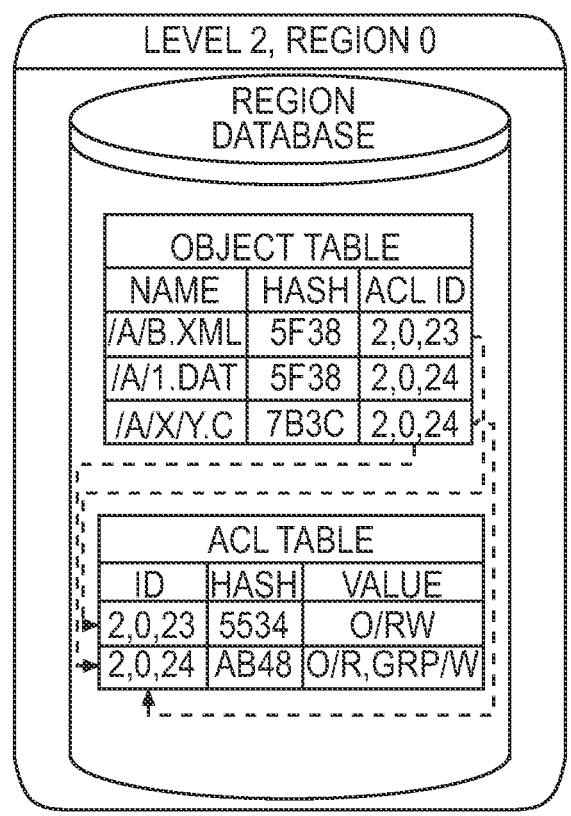
FIG. 6 is a diagram illustrating the many-to-one relationship between the object table and the ACL table in one region database with the ACL ID as the identifier.

This ACL ID 500 is generated and assigned when a new unique ACL is required in the region database (e.g., updating ACL, adding ACL, or ingesting new content). Using this ACL ID scheme, the diagram as seen in FIG. 6 illustrates the many-to-one relationship between the object table and the ACL table in one region database with the ACL ID as the identifier. All associations between the metadata records are contained in the individual region database. With a region map level of 2, there will be $2^2=4$ region databases. Only one region database is shown in FIG. 6. It is Level 2, Region 0.

IV. Cluster Database Region Expansion

Figure 7:
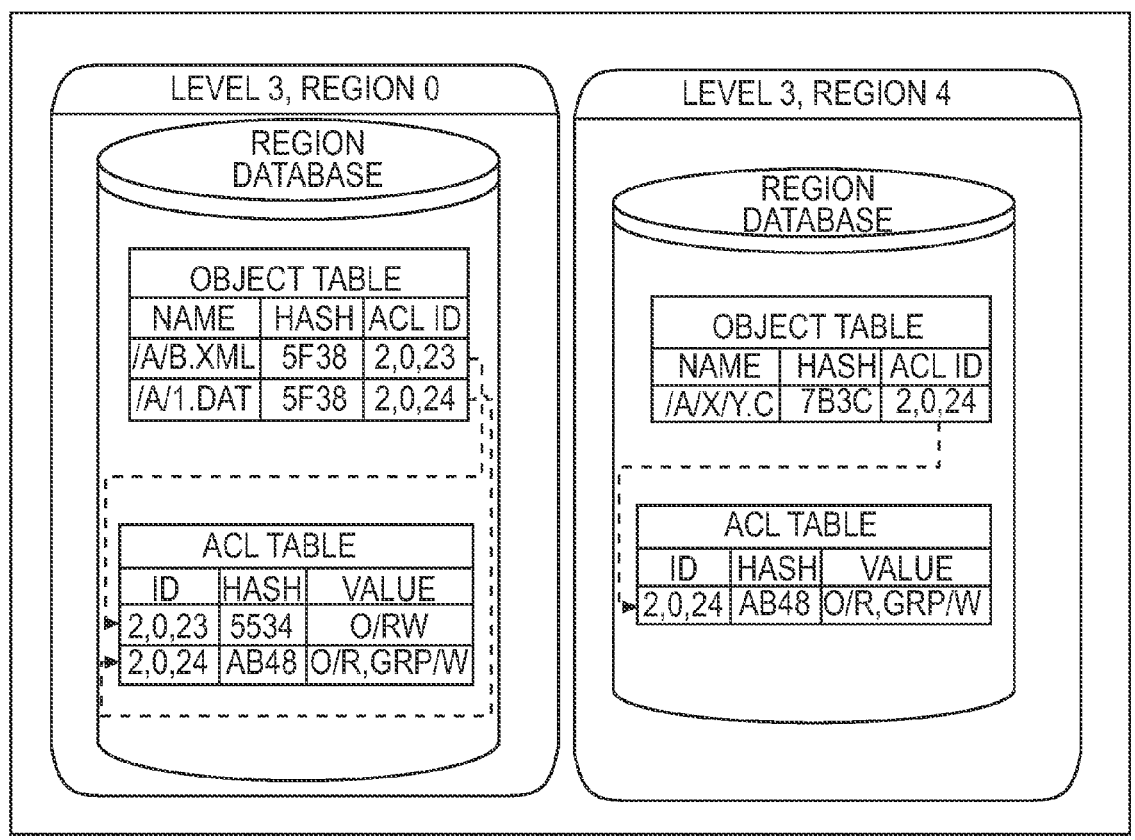
FIG. 7 shows the many-to-one relationship between the object table and the ACL table in expanded region databases with the ACL ID as the identifier to illustrate object metadata distribution post region split after cluster database region expansion from the one region database of FIG. 6.

Upon expansion of the cluster database, more region databases are needed. This is accomplished by increasing the region map level, for instance, from 2 to 3. This will create $2^3=8$ region databases. With these new databases and regions, all object metadata needs to be redistributed to the appropriate region for which the object hash indicates. A query on the old region database will be performed to identify all object metadata for a new region. All the object metadata will be bulk copied to the new region database. Using the example in FIG. 5, this approach will result in the distribution of objects to the new region databases as seen in FIG. 7. FIG. 7 shows the many-to-one relationship between the object table and the ACL table in expanded region databases with the ACL ID as the identifier to illustrate object metadata distribution post region split after cluster database region expansion with respect to the example of FIG. 6. Two regions are shown, which are Level 3, Region 0, and Level 3, Region 4.

This post split example shows that each region database contains all object metadata assigned to that region database including their ACL information contained in a separate table (ACL table). Notice that the ACL IDs are not changed from the originally assigned/pre-split values and can still be used to support the object and ACL metadata associations as a primary ACL table key. To maintain the rule that each region database must contain all metadata for an object managed by that region, each region database will have its own copy of the ACLs. Therefore, there may be two copies within the cluster-wide database in the example shown.

V. Cluster Database Region Reduction

Figure 8:
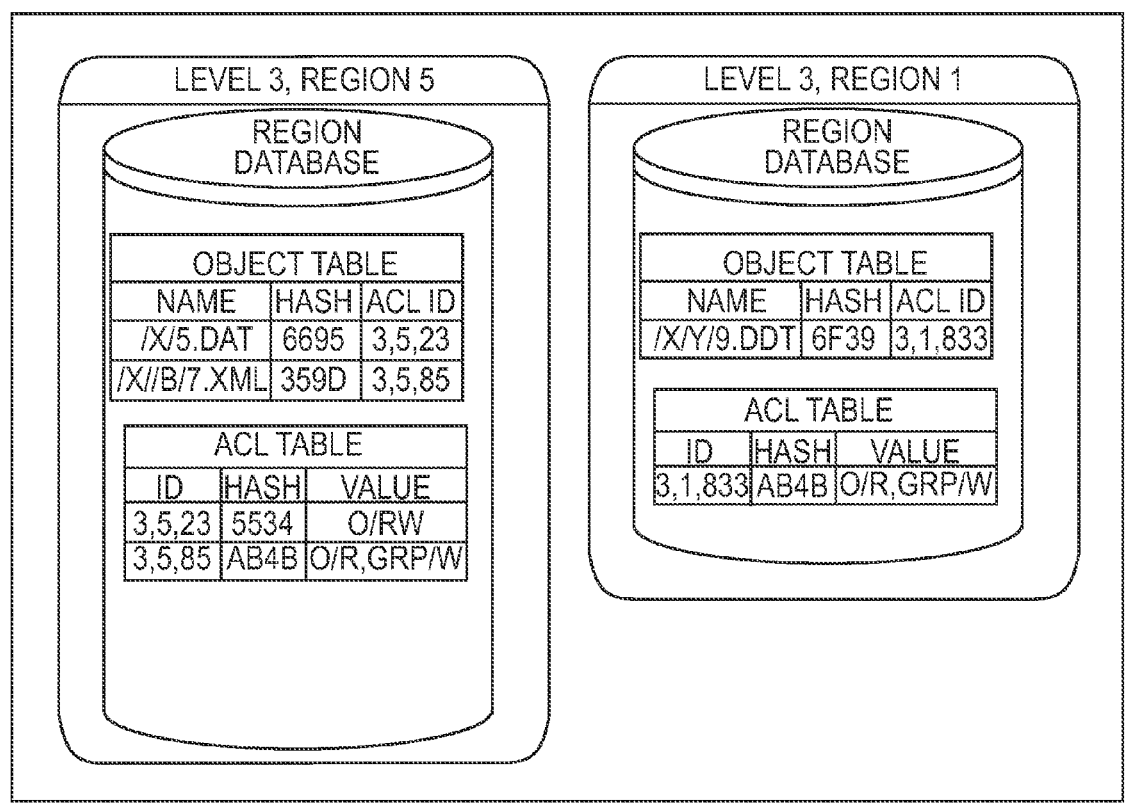
FIG. 8 shows two of the pre-merge region databases that would be combined if the region map level were to be reduced, thus requiring the database records to be combined due to cluster database region reduction.

During cluster maintenance/re-configuration, it may be necessary to reduce the number of region databases. This will result in the combining of multiple region databases and thus the object metadata must be merged. In this example, the system is currently at region map level 3, thus there are $2^3=8$ region databases. FIG. 8 shows two of the region databases that would be combined if the region map level were to be reduced from 3 to 2, thus requiring the database records to be combined. They are Level 3, Region 5, and Level 3, Region 1.

Figure 9:
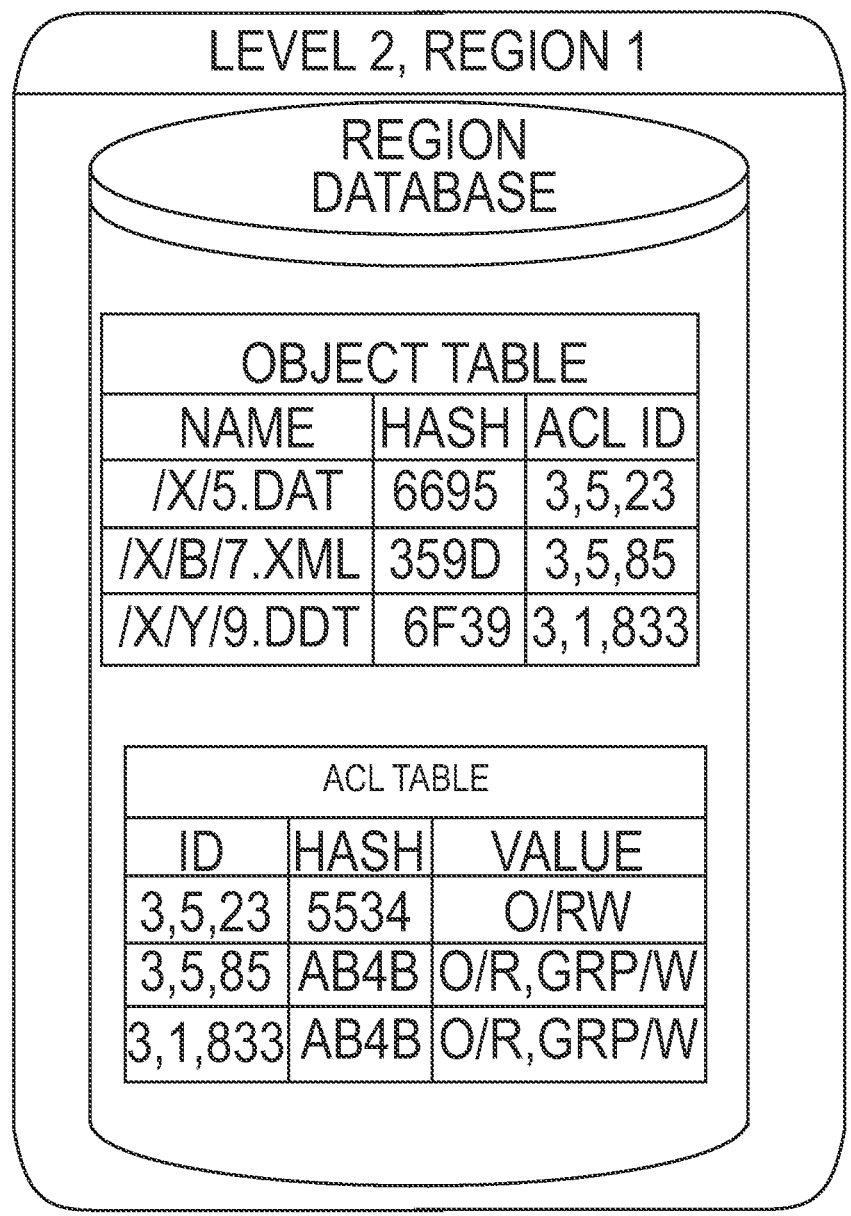
FIG. 9 shows one post-merge region database after cluster database region reduction from the two pre-merge region database of FIG. 8.

When a database merge is performed, all table records from the region databases are copied in bulk to the new region database. For the object table, there should be no concern about duplicates since no two regions should be managing the metadata for a given object. However, in the ACL table, there could be duplication of ACL table records where an ACL was created in one region/map, the database tables split, then subsequently merged back together. In this instance, the conflicting ACL record will only be written once. The merge operation will result in the region database as seen in FIG. 9. FIG. 9 shows one post-merge region database after cluster database region reduction from the two pre-merge region database of FIG. 8.

In the event that there are multiple ACL records that have the same hash/value pair (as can be observed in FIG. 9 (3,5,85) and (3,1,833)), these can be cleaned up by an optional background process that will identify the duplicates, update all references to one of the duplicates, and remove the ones no longer referenced (i.e., (3,5,85) to be removed), thus resulting a smaller number of records in the ACL table. This kind of triage is typically not performed during the merge operation to make the merge operation as efficient as possible, thus minimizing down time.

Figure 10:
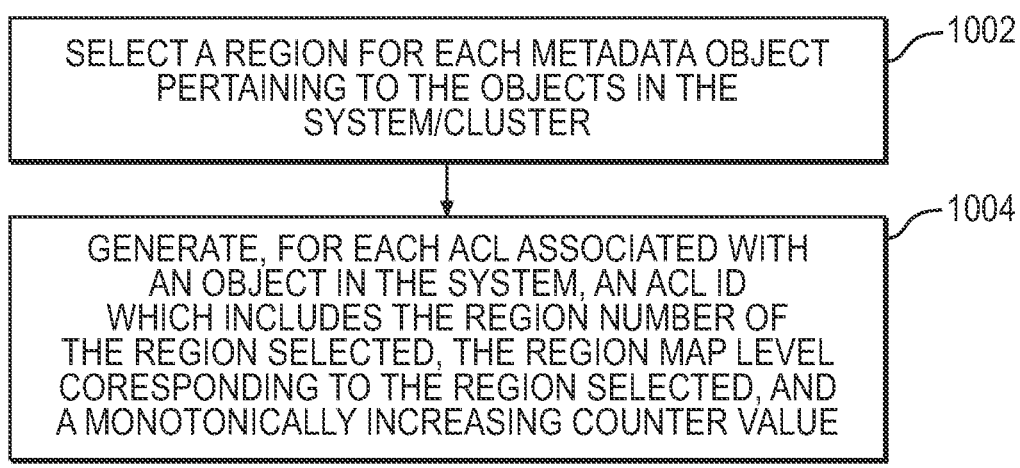
FIG. 10 is an example of a flow diagram illustrating a process performed by a search key module in providing an ACL ID as a search key to each ACL in any one system/cluster.

FIG. 10 is an example of a flow diagram illustrating a process performed by a search key module (typically residing in the Metadata Manager 328) in providing an ACL ID as a search key to each ACL in any one system/cluster. In step 1002, the search key module selects a region for each metadata object pertaining to the objects in the system/cluster. This typically occurs at the time of creation of the regions. Each region has a region number. As discussed above in connection with FIGS. 3 and 4, the region number of the region to select for a metadata object is identified by hashing a metadata object attribute of the metadata object and extracting a number of bits of a resulting hash value. A region map for each region identifies a node that stores an authoritative region copy of the region and further identifies zero or more nodes that each store a backup copy of the region. A region map level dictates the number of bits to use of the resulting hash value to identify the region for the metadata object. There are $2^N$ regions and N is the region map level. In step 1004, the search key module generates, for each ACL associated with an object in the system, an ACL ID as a search key which includes the region number of the region selected for the metadata object pertaining to the object, the region map level corresponding to the region selected, and a monotonically increasing counter value that is automatically incremented each time an ACL ID is generated (see FIG. 5). Each region is uniquely identified by a combination of the region map level and the region number. Each ACL ID is uniquely identified by a combination of the region map level and the region number and the counter value. Each region has a corresponding region database that shows, via the ACL IDs, relationships between the objects and the ACLs associated with the objects in the system (see FIGS. 6-9).

Figure 11:
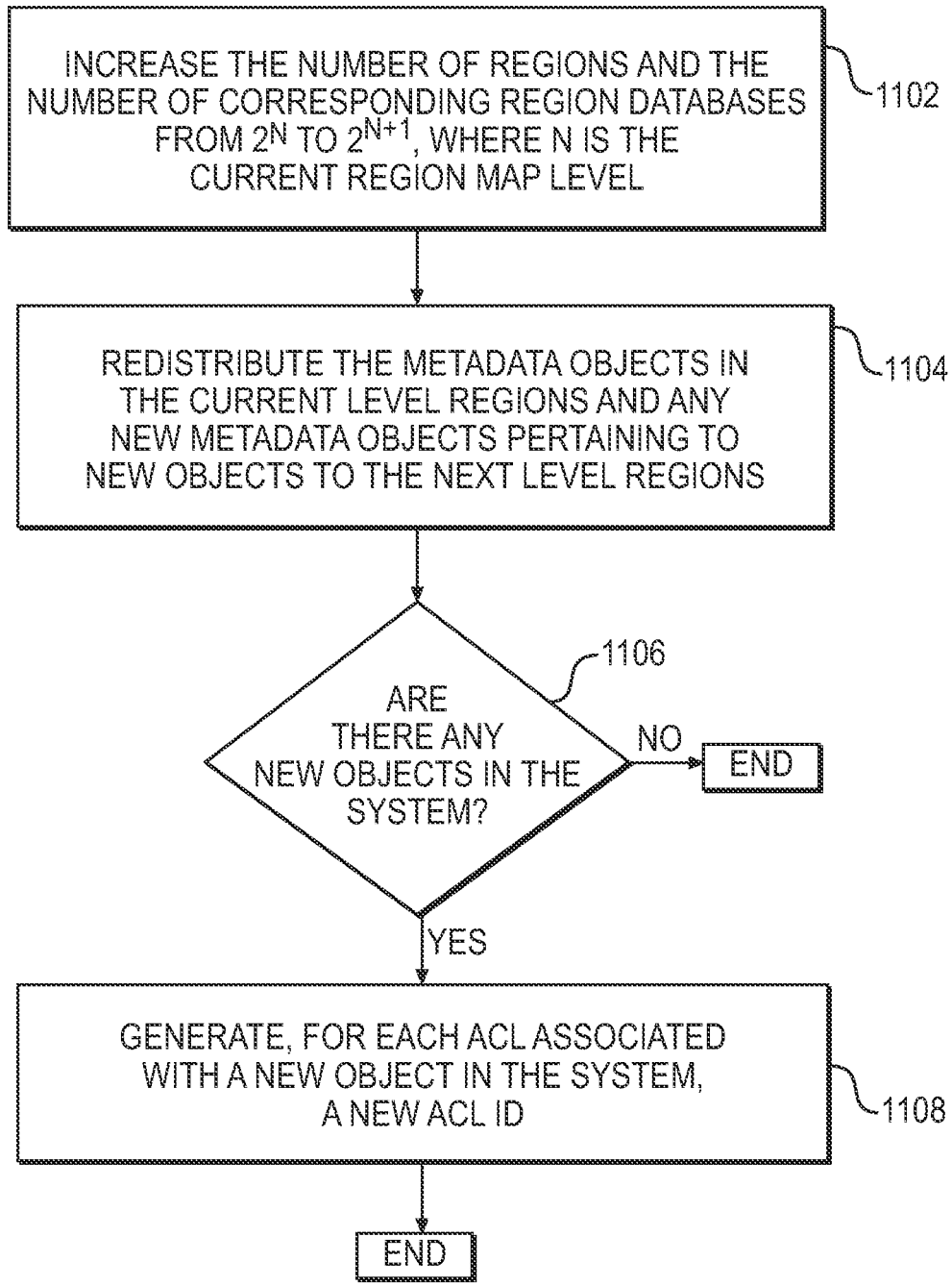
FIG. 11 is an example of a flow diagram illustrating a process performed by the search key module during cluster database region expansion.

FIG. 11 is an example of a flow diagram illustrating a process performed by the search key module during cluster database region expansion (see FIGS. 6 and 7). The process is executed in response to increasing the region map level from a current region map level of N to a next region map level of N+1. In step 1102, the search key module increases the number of regions and the number of corresponding region databases from $2^N$ current level regions and current level region databases to $2^{N+1}$ next level regions and next level region databases. In step 1104, the search key module redistributes the metadata objects in the current level regions and any new metadata objects pertaining to new objects to the next level regions. As before, the region number of the region of the next level regions to select for a metadata object is identified by hashing a metadata object attribute of the metadata object and extracting a number of bits of a resulting hash value, and the next region map level dictates the number of bits to use of the resulting hash value to identify the region for the metadata object. In step 1106, the search key module determines whether there are one or more new objects in the system. If yes, the search key module generates in step 1108, for each ACL associated with a new object in the system, a new ACL ID which includes the region number of the region selected for the new metadata object pertaining to the new object, the region map level corresponding to the region selected, and the monotonically increasing counter value that is automatically incremented each time an ACL ID is generated. In specific embodiments, the redistributing includes, for each next level region database, performing a query on the current level region databases to identify all metadata objects to be redistributed to said each next level region database; and copying the identified metadata objects to said each next level region database.

Figure 12:
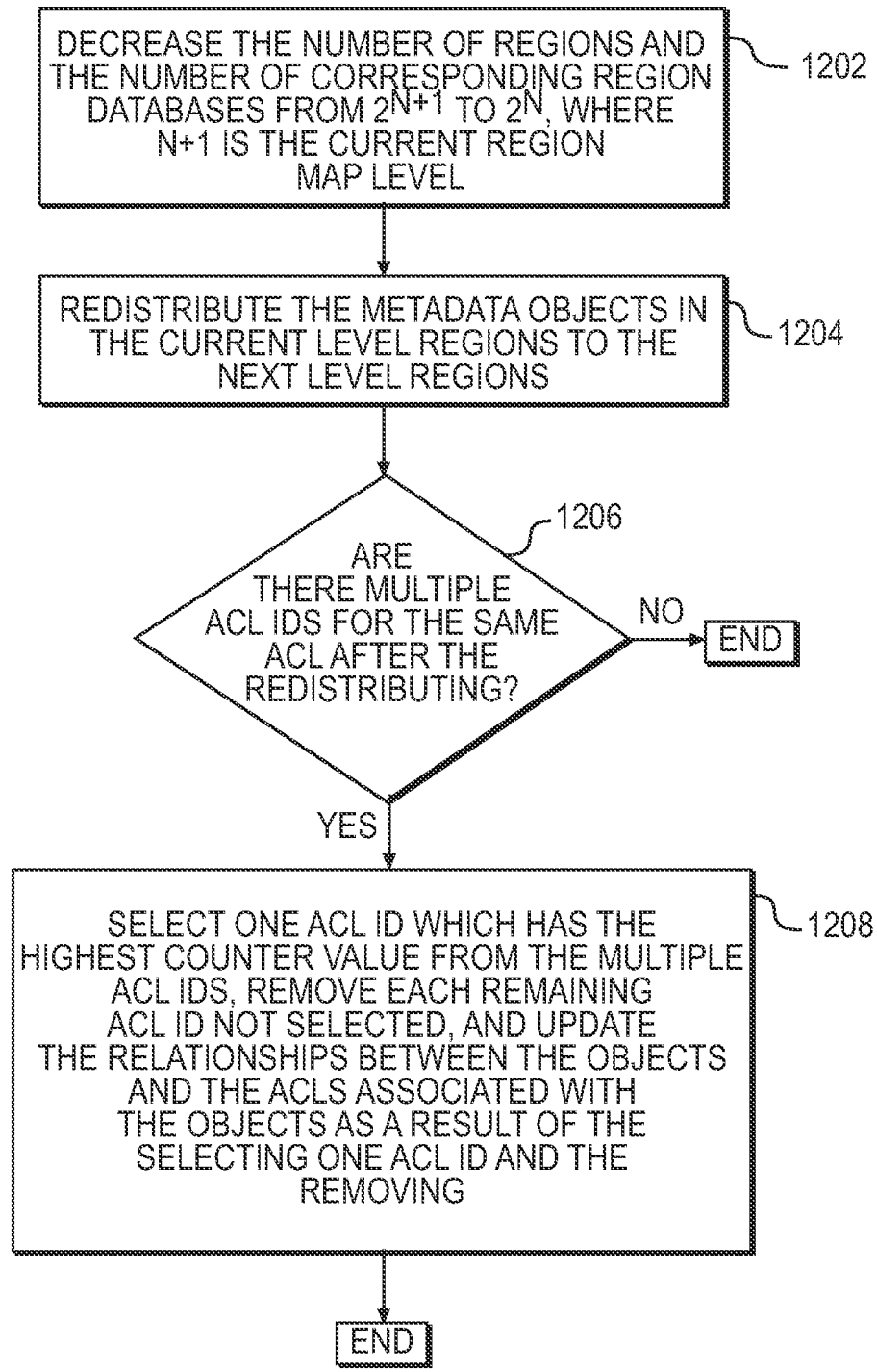
FIG. 12 is an example of a flow diagram illustrating a process performed by the search key module during cluster database region reduction.

FIG. 12 is an example of a flow diagram illustrating a process performed by the search key module during cluster database region reduction (see FIGS. 8 and 9). This process is executed in response to decreasing the region map level from a current region map level of N to a next region map level of N−1. In step 1202, the search key module decreases the number of regions and the number of corresponding region databases from $2^N$ current level regions and current level region databases to $2^{N-1}$ next level regions and next level region databases. In step 1204, the search key module redistributes the metadata objects in the current level regions to the next level regions. As before, the region number of the region of the next level regions to select for a metadata object is identified by hashing a metadata object attribute of the metadata object, and wherein the next region map level dictates the number of bits to use of the resulting hash value to identify the region for the metadata object. In specific embodiments, the redistributing includes: for each next level region database, performing a query on the current level region databases to identify all metadata objects to be redistributed to said each next level region database; and copying the identified metadata objects to said each next level region database.

In step 1206, the search key module determines whether there are multiple ACL IDs for the same ACL after the redistributing. If yes, in step 1208, the search key module selects one ACL ID which has the highest counter value from the multiple ACL IDs, removes each remaining ACL ID not selected from the multiple ACL IDs, and updates the relationships between the objects and the ACLs associated with the objects in the system as a result of the selecting one ACL ID and the removing. This preferably is carried out in the background and not during the merge operation to make the merge operation as efficient as possible, thus minimizing down time.

Of course, the system configurations illustrated in FIGS. 1 and 4 are purely exemplary of content platforms or replicated object storage systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for providing a unique search key to the ACL for any given object in a replicated object storage system. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

CITATION LIST

Patent Literature

[PTL 1]
U.S. Patent Publication No. 2007/0189153
[PTL 2]
U.S. Pat. No. 7,657,581

What is claimed is:

1. A method for a system comprising a plurality of nodes, the system configured to store objects having access control lists (ACLs) associated with the objects, and, metadata objects associated with the objects in a plurality of regions distributed across the plurality of nodes, the method comprising:
   selecting a region from the plurality of regions for each metadata object, wherein a region number of the selected region to store a metadata object is identified by hashing a metadata object attribute of the metadata object and extracting a number of bits of a resulting hash value, wherein a region map level dictates the number of bits to use of the extracted number of bits of the hash value to identify the region for the metadata object, and dictates the number of regions;
   generating an ACL ID (identifier), the ACL ID including the region number of the selected region to store the metadata object pertaining to an object, the region map level corresponding to the selected region, and a counter value that is incremented each time an ACL ID is generated;
   when a redistributing of the metadata objects occurs and when there are multiple ACL IDs for a same ACL after the redistributing:
   selecting one ACL ID which has the highest counter value from the multiple ACL IDs;
   removing each remaining ACL ID not selected from the multiple ACL IDs; and updating the relationships between the objects and the ACLs associated with the objects in the system as a result of the selecting one ACL ID and the removing of each remaining ACL ID.

2. The method according to claim 1,
wherein each region is uniquely identified by a combination of the region map level and the region number;
wherein each ACL ID is uniquely identified by a combination of the region map level and the region number and the counter value; and
wherein each region has a corresponding region database that shows, via the ACL IDs, relationships between the objects and the ACLs associated with the objects in the system.

3. The method according to claim 2, further comprising, in response to increasing the region map level from a current region map level of N to a next region map level of N+1:
increasing the number of regions and the number of corresponding region databases from $2^N$ current level regions and current level region databases to $2^{N+1}$ next level regions and next level region databases;
redistributing the metadata objects in the current level regions and any new metadata objects pertaining to new objects to the next level regions, wherein the region number of the region of the next level regions to select for a metadata object is identified by hashing a metadata object attribute of the metadata object and extracting a number of bits of a resulting hash value, and wherein the next region map level dictates the number of bits to use of the extracted number of bits of the hash value to identify the region for the metadata object; and
if there are one or more new objects in the system, then generating a new ACL ID including the region number of the selected region to store the new metadata object pertaining to the new object, the region map level corresponding to the selected region, and the counter value that is incremented each time an ACL ID is generated.

4. The method according to claim 3, wherein the redistributing comprises:
for each next level region database, performing a query on the current level region databases to identify all metadata objects to be redistributed to said each next level region database; and
copying the identified metadata objects to said each next level region database.

5. The method according to claim 2, further comprising, in response to decreasing the region map level from a current region map level of N to a next region map level of N−1:
decreasing the number of regions and the number of corresponding region databases from $2^N$ current level regions and current level region databases to $2^{N-1}$ next level regions and next level region databases; and
redistributing the metadata objects in the current level regions to the next level regions, wherein the region number of the region of the next level regions to select for a metadata object is identified by hashing a metadata object attribute of the metadata object and extracting a number of bits of a resulting hash value, and wherein the next region map level dictates the number of bits to use of the extracted number of bits of the hash value to identify the region for the metadata object.

6. The method according to claim 5, wherein the redistributing comprises:
for each next level region database, performing a query on the current level region databases to identify all metadata objects to be redistributed to said each next level region database; and
copying the identified metadata objects to said each next level region database.

7. A system configured to store objects having access control lists (ACLs) associated with the objects, and metadata objects associated with the objects in a plurality of regions distributed in the system, the system comprising:
a network; and
a plurality of nodes coupled by the network, each of the nodes include a processor configured to:
select a region from the plurality of regions for each metadata object, wherein a region number of the selected region to store a metadata object is identified by hashing a metadata object attribute of the metadata object and extracting a number of bits of the hash value, wherein a region map level dictates the number of bits to use of the extracted number of bits of the hash value to identify the region for the metadata object, and dictates the number of the regions;
generate an ACL ID (identifier), the ACL ID including the region number of the selected region to store the metadata object pertaining to an object, the region map level corresponding to the selected region, and a counter value that is incremented each time an ACL ID is generated;
when a redistributing of the metadata objects occurs and when there are multiple ACL IDs for a same ACL after the redistributing:
selecting one ACL ID which has the highest counter value from the multiple ACL IDs;
removing each remaining ACL ID not selected from the multiple ACL IDs; and updating the relationships between the objects and the ACLs associated with the objects in the system as a result of the selecting one ACL ID and the removing of each remaining ACL ID.

8. The apparatus according to claim 7,
wherein each region is uniquely identified by a combination of the region map level and the region number;
wherein each ACL ID is uniquely identified by a combination of the region map level and the region number and the counter value; and
wherein each region has a corresponding region database that shows, via the ACL IDs, relationships between the objects and the ACLs associated with the objects in the system.

9. The apparatus according to claim 8, wherein the processor is configured, in response to increasing the region map level from a current region map level of N to a next region map level of N+1, to:
increase the number of regions and the number of corresponding region databases from $2^N$ current level regions and current level region databases to $2^{N+1}$ next level regions and next level region databases;
redistribute the metadata objects in the current level regions and any new metadata objects pertaining to new objects to the next level regions, wherein the region number of the region of the next level regions to select for a metadata object is identified by hashing a metadata object attribute of the metadata object and extracting a number of bits of a resulting hash value, and wherein the next region map level dictates the number of bits to use of the extracted number of bits of the hash value to identify the region for the metadata object; and
if there are one or more new objects in the system, then generate a new ACL ID including the region number of the selected region to store the new metadata object pertaining to the new object, the region map level corresponding to the selected region, and the counter value that is incremented each time an ACL ID is generated.

10. The apparatus according to claim 9, wherein the redistributing comprises:
   for each next level region database, performing a query on the current level region databases to identify all metadata objects to be redistributed to said each next level region database; and
   copying the identified metadata objects to said each next level region database.

11. The apparatus according to claim 8, wherein the processor is configured, in response to decreasing the region map level from a current region map level of N to a next region map level of N−1, to:
   decrease the number of regions and the number of corresponding region databases from $2^N$ current level regions and current level region databases to $2^{N-1}$ next level regions and next level region databases; and
   redistribute the metadata objects in the current level regions to the next level regions, wherein the region number of the region of the next level regions to select for a metadata object is identified by hashing a metadata object attribute of the metadata object and extracting a number of bits of a resulting hash value, and wherein the next region map level dictates the number of bits to use of the extracted number of bits of the hash value to identify the region for the metadata object.

12. The apparatus according to claim 11, wherein the redistributing comprises:
   for each next level region database, performing a query on the current level region databases to identify all metadata objects to be redistributed to said each next level region database; and
   copying the identified metadata objects to said each next level region database.

* * * * *